United States Patent [19]
Brennen et al.

[11] Patent Number: 5,351,181
[45] Date of Patent: Sep. 27, 1994

[54] LOW COST ACTIVE POWER LINE CONDITIONER

[75] Inventors: Michael B. Brennen; Steven A. Moran; Laszlo Gyugyi, all of Pittsburgh, Pa.

[73] Assignee: Electric Power Research Institute, Inc., Palo Alto, Calif.

[21] Appl. No.: 30,783

[22] Filed: Mar. 12, 1993

[51] Int. Cl.⁵ .......................... H02M 1/12; G05F 1/70
[52] U.S. Cl. ........................................ 363/71; 363/40; 363/98; 307/105
[58] Field of Search ..................... 363/35, 37, 41, 71, 363/97, 98; 323/205, 207, 208, 209, 210; 307/105; 318/798, 803, 805–812; H02M 1/12, 5/40; G05F 1/70

[56] References Cited

U.S. PATENT DOCUMENTS

| | | |
|---|---|---|
| 3,863,140 | 1/1975 | Easter et al. . |
| 4,063,144 | 12/1977 | Hucker et al. . |
| 4,410,935 | 10/1983 | Dang . |
| 4,460,834 | 7/1984 | Gottfried . |
| 4,473,756 | 9/1984 | Brigden et al. . |
| 4,564,767 | 1/1986 | Charych . |
| 4,651,265 | 3/1987 | Stacey et al. . |
| 4,686,375 | 8/1987 | Gottfried . |
| 4,713,745 | 12/1987 | Schauder . |
| 4,728,808 | 3/1988 | Bet-Esh et al. . |
| 4,800,326 | 1/1989 | Unsworth . |
| 4,811,236 | 3/1989 | Brennen et al. . |
| 4,812,779 | 3/1989 | Wagner . |
| 4,814,683 | 3/1989 | Okamoto et al. . |
| 4,827,150 | 5/1989 | Reynal . |
| 4,835,454 | 5/1989 | White . |
| 4,862,054 | 8/1989 | Schauder . |
| 4,876,460 | 10/1989 | Johnson . |
| 4,937,720 | 6/1990 | Kirchberg . |
| 4,943,783 | 7/1990 | Nojima . |
| 4,962,339 | 10/1990 | Schauder . |
| 4,962,976 | 10/1990 | Takahashi et al. . |
| 4,980,812 | 12/1990 | Johnson, Jr. et al. . |
| 4,994,956 | 2/1991 | Kirchberg et al. . |
| 4,996,462 | 2/1991 | Krummel . |
| 5,001,619 | 3/1991 | Nakajima et al. . |
| 5,016,157 | 5/1991 | Rozman et al. . |
| 5,038,092 | 8/1991 | Asano et al. . |
| 5,047,909 | 9/1991 | Hosoda . |
| 5,047,910 | 9/1991 | Levran et al. . |
| 5,047,914 | 9/1991 | Dhyanchand et al. . |
| 5,051,704 | 9/1991 | Chapman et al. . |
| 5,075,634 | 12/1991 | French . |
| 5,077,532 | 12/1991 | Obermann et al. . |

OTHER PUBLICATIONS

Proc. 4th Euro. Conf. on Power Electronics and Applications, Florence, Italy, 1991, vol. 3, pp. 30–35.

Peng, F. Z. et al; "A New Approach to Harmonic Compensation in Power Systems," IEEE/IAS Annual Meeting, pp. 874–880, 1988.

Banerjee, B. Ben et al; "Design of an Active Series/Passive Parallel Harmonic Filter for ASD Loads at a Wastewater Treatment Plant," Proc. of the 2nd International Power Quality Applications Conference, PQA, '92, Atlanta 1992.

*Primary Examiner*—Emanuel T. Voeltz
*Attorney, Agent, or Firm*—Flehr, Hohbach, Test, Albritton & Herbert

[57] ABSTRACT

A novel active power line conditioner is disclosed. The apparatus includes a parallel inverter, with a dc-link, coupled to an output line. The parallel inverter is controlled by a parallel inverter controller which forces the parallel inverter to act as a variable capacitor or inductor. The parallel inverter controller identifies and feeds-forward a desired phase shift value between an active power line conditioner voltage output signal and an active power line conditioner voltage input signal. Utilization of the desired phase shift value results in voltage control of the dc-link of the parallel inverter. The parallel inverter controller also produces a tuning capacitance current reference signal which reduces voltage magnitude errors of the output voltage.

18 Claims, 5 Drawing Sheets

LOW COST ACTIVE POWER LINE CONDITIONER

The present application is related to the following commonly assigned applications:

Active Power Line Conditioner with Synchronous Transformation Control, filed Oct. 30, 1992, Ser. No. 07/968,850;

Active Power Line Conditioner with Fundamental Negative Sequence Compensation, filed Oct. 30, 1992, Ser. No. 07/969,932;

Active Power Line Conditioner with Fast Dynamic Response, filed Oct. 30, 1992, Ser. No. 07/969,344;

Highly Fault Tolerant Active Power Line Conditioner, filed Oct. 30, 1992, Ser. No. 07/969,772;

Active Power Line Conditioner with Low Cost Surge Protection, filed Oct. 30, 1992, Ser. No. 07/969,137;

Load Current Fundamental Filter With One Cycle Response, filed Oct. 30, 1992, Ser. No. 07/969,081; and Harmonic Controller for an Active Power Line Conditioner, filed Oct. 30, 1992, Ser. No. 07/968,847.

BRIEF DESCRIPTION OF THE INVENTION

This invention relates generally to active power line conditioners which deliver electric power with reduced distortion. This invention more particularly relates to a simplified active power line conditioner with a single inverter controlled by a derived optimal voltage phase shift parameter and a derived inverter capacitance signal.

BACKGROUND OF THE INVENTION

Power electronic circuits are used to control and condition electric power. For instance, power electronic circuits may be used to convert a direct current into an alternating current, to change voltage or current magnitude, or to change the frequency of an alternating current.

An inverter is a power electronic circuit which receives a dc source signal and converts it into an ac output signal. Harmonic neutralization and pulse-width modulation techniques are used to generate the ac signal. Harmonic neutralization involves a combination of several phase-shifted square-wave inverters, each switching at the fundamental frequency. Pulse-width modulation involves switching a single inverter at a frequency several times higher than the fundamental.

Inverter switching action generates transients and spurious frequencies in a power signal, usually in the form of harmonics of the switching frequency. The switching action may also produce electromagnetic interference (EMI) which is radiated or conducted through the supply line. While the internal design of an inverter is chosen to minimize transients and spurious frequencies, it is usually necessary to filter the input or the output of the inverter.

Filters can be classified according to whether their main purpose is to improve the power waveform or to remove EMI. Filters for waveform improvement usually deal with frequencies in the audio range. EMI filters are usually concerned with frequencies of 455 kHz or higher.

Passive filters are typically used to eliminate undesirable harmonics from the inverter output. Unfortunately, passive filters do not provide continuous harmonic filtering on pulsating or randomly varying loads. This occurs because passive filters only adapt to new harmonic levels after a considerable settling delay.

Passive filters tend to be large, heavy, costly, and, in general, highly load-dependent. Consequently, passive filters frequently represent a substantial part of the total cost, weight, and size of power electronics equipment.

Active filters represent an emerging technology without many of the shortcomings associated with passive filters. The technology relies upon the theory of active-feedback filters. A feedback loop with a single energy-storage element (an inductor or capacitor) is used to minimize the difference between the actual waveform and the desired waveform.

The urgency of developing successful active power filters has recently grown in view of the increasing waveform distortion of both voltages and currents in ac power distribution systems. These distortions are largely attributable to a growing number of nonlinear loads in the electric utility power network. Typical nonlinear loads are computer controlled data processing equipment, numerical controlled machines, variable speed motor drives, robotics, medical and communication equipment.

Nonlinear loads draw square wave or pulse-like currents instead of purely sinusoidal currents drawn by conventional linear loads. As a result, nonlinear current flows through the predominantly inductive source impedance of the electric supply network. Consequently, a nonlinear load causes load harmonics and reactive power to flow back into the power source. This results unacceptable voltage harmonics and load interaction in the electric power distribution in spite of the existence of voltage regulators.

The degree of current or voltage distortion can be expressed in terms of the relative magnitudes of harmonics in the waveforms. Total Harmonic Distortion (THD) is one of the accepted standards for measuring voltage or current quality in the electric power industry.

Apart from voltage and current distortion, another related problem may arise when nonlinear loads are connected to the electric power network. In particular, when the load current contains large amounts of third or other triplen harmonics, the harmonic current tends to flow in the neutral conductor of the power system. Under these conditions, the neutral current can exceed the rated current of the neutral conductor. Since the neutral is normally designed to carry only a fraction of the line current, overheating or even electric fires can result.

As previously indicated, active filters may be used to alleviate these problems. Active filters, or active power line conditioners (APLCs), comprise one or two pulse width modulated inverters in a series, parallel, or series-parallel configuration. Series/parallel configured inverters share a common dc link, which can be a dc inductor (current link) or a dc capacitor (voltage link). It is advantageous to keep the energy stored in the dc link (capacitor voltage or inductor current) at an essentially constant value. The voltage on the dc link capacitor can be regulated by injecting a small amount of real current into the dc link. The injected current covers the switching and conduction losses inside the APLC. The link voltage control can be performed by the parallel inverter.

The basic active load current compensation with current or voltage source filters is known. FIG. 1 depicts a parallel connected current source active filter 20, and FIG. 2 depicts a parallel connected voltage source active filter 22. The load current $I_L$ consists of three components: The real current, $I_r$, the reactive current, $I_q$, and the ripple current, $I_R$. The parallel connected active filter supplies the $I_R$ and $I_q$ components, and, also, a small residual "high frequency" component $I_{hf}$, that flows into the parallel connected "high frequency" capacitor $C_{hf}$. The parallel connected active filter is essentially a single or multi-phase inverter which is operated from an isolated current or voltage source.

The realization of the active filter requires solid state switches with intrinsic turn-off capability (transistors, IGBTs, MOSFETs, GTOs, etc.). Switch pairs P1 and P2 are alternately turned ON and/or OFF. The average voltage required in the link capacitor, $V_{dc}$, of FIG. 2, is supplied by the ac source. Real power can be absorbed by introducing an appropriate amount of offset in the symmetry of the on-times in switches P1 and P2. The polarity of the offset is coordinated with the polarity of the input voltage. When switches P1 of FIG. 2 are on, a resonant current is generated between the tie inductor, Lp, the output capacitance dominated by $C_{hf}$, and the difference between the dc link and ac output voltages. Conversely, when the P2 switch pair is on, the resonant current is driven by the sum of the dc link and ac output voltages. Since the dc link voltage is regulated to be larger than the peak value of the ac voltage, the voltage polarity that drives the resonant current will reverse after each complementary pole switching.

The real power necessary to maintain the selected dc link voltage magnitude, Vdc, is proportional to the average duty cycle of high-frequency pole switchings in any given half line voltage cycle. The isolated dc link voltage is regulated by a closed loop controller that affects the average pole switching symmetry. Reactive inverter currents can be produced that flow in or out of the inverter by temporary changes in the duty cycle of inverter pole switchings. The instantaneous magnitudes of inverter currents are regulated so that they provide the load compensation current requirements. For example, if a positive ripple current is detected, the on-time of P2 is increased with respect to P1. The increase results in the required net compensating ripple current flowing in the ac line. This also implies that the amplitude of Vdc must be kept higher than the highest value of the ac voltage across the load, otherwise, the instantaneous compensation capability of the active filter is impaired.

The rapid pulse width modulation switching in the active filter produces a high frequency, typically, triangular shaped current, $I_{hf}$, an undesired side effect. The effect of the $I_{hf}$ signal is a small, superimposed saw-tooth voltage ripple on the ac voltage. With a given tie inductor value, the amplitude of the voltage ripple is inversely proportional to the pole switching (carrier) frequency and the value of $C_{hf}$. The voltage ripple is filtered with a parallel capacitor $C_{hf}$.

When the active power filter (20 or 22) is connected across the load, a high degree of filtering of the terminal voltage is observed. Note that the active power filter is not capable of supplying or absorbing any real power other than that which is needed to compensate for losses inside the filter itself. It will, however, readily compensate reactive currents, non-synchronous and non-theoretical harmonics, and sources with variable or unregulated frequency.

Series-parallel active power line conditioners have the advantage that they can supply and absorb real power. They are also advantageous since they provide broad power conditioning capabilities. On the other hand, these benefits are accompanied by a number of disadvantages.

One disadvantage associated with series-parallel active power line conditioners is that the series connected inverter of the APLC must include expensive surge protection circuitry. If the series inverter is rated to handle the high surge voltages, the parallel inverter must also be rated to the same high voltage, since the two inverters share a common dc voltage link. In fact, the dc link must be charged to a higher than peak ac voltage level in order to maintain current control and thus avoid false, series inverter over-current trips. To rate the inverters for these surge voltage and surge current rating requirements may not result in a commercially competitive product. Thus, it is important to develop a cost-effective APLC which complies with surge rating requirements in a different way.

The surge protective functions override the active power quality controllers in an active power line conditioner. Consequently, a protective function, while in effect, can result in a temporary compromise in the output power quality, such as: elimination of output voltage regulation, injection of load harmonics back into the source, and uncompensated input voltage harmonics applied to the load. Thus, it would be highly desirable to provide an active power line conditioner which does not rely upon surge protective functions which will compromise output power quality.

OBJECTS AND SUMMARY OF THE INVENTION

Thus, it is a general object of the present invention to provide an improved active power line conditioner.

It is a more particular object of the invention to provide an active power line conditioner with inherent surge protection capabilities.

It is another object of the invention to provide an active power line conditioner employing a single parallel filter which is controlled by derived voltage phase shift and capacitive inverter current parameters.

It is another object of the invention to provide dc-link voltage control for a parallel inverter through phase shifts of an output voltage reference signal.

It is a related object of the invention to provide output voltage magnitude modulation by varying the amount of capacitive inverter current.

These and other objects are achieved by the active power line conditioner of the invention. The apparatus includes a series inductor and a parallel inverter, with a dc-link, coupled to an output line. The parallel inverter is controlled by a parallel inverter controller which forces the parallel inverter to act as a variable capacitor. The parallel inverter controller identifies and feeds-forward a desired phase shift value between an active power line conditioner voltage output signal and an active power line conditioner voltage input signal. Utilization of the desired phase shift value results in voltage control of the dc-link of the parallel inverter. The parallel inverter controller also produces a tuning capacitive current reference signal which further reduces voltage magnitude errors of the dc-link.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
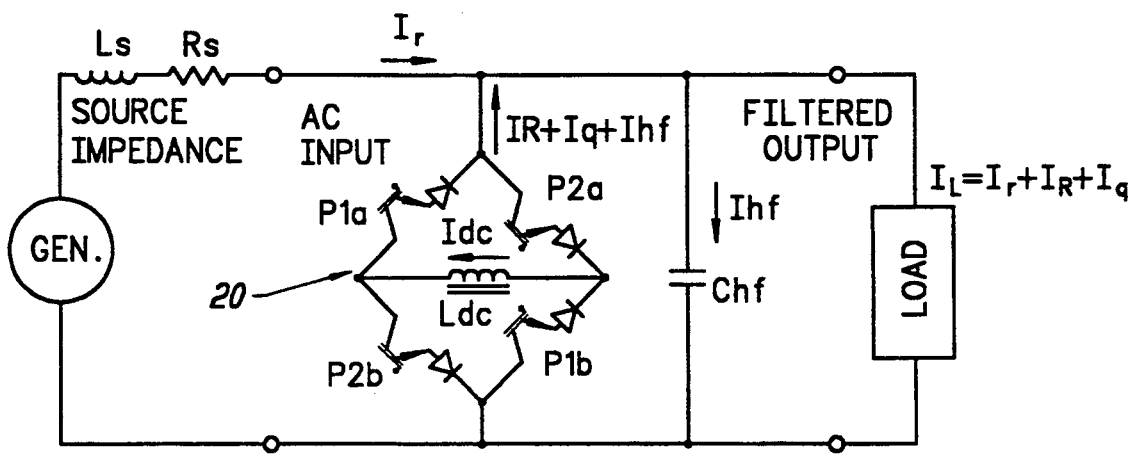
FIG. 1 is a parallel connected current source active filter in accordance with the prior art.
Figure 2:
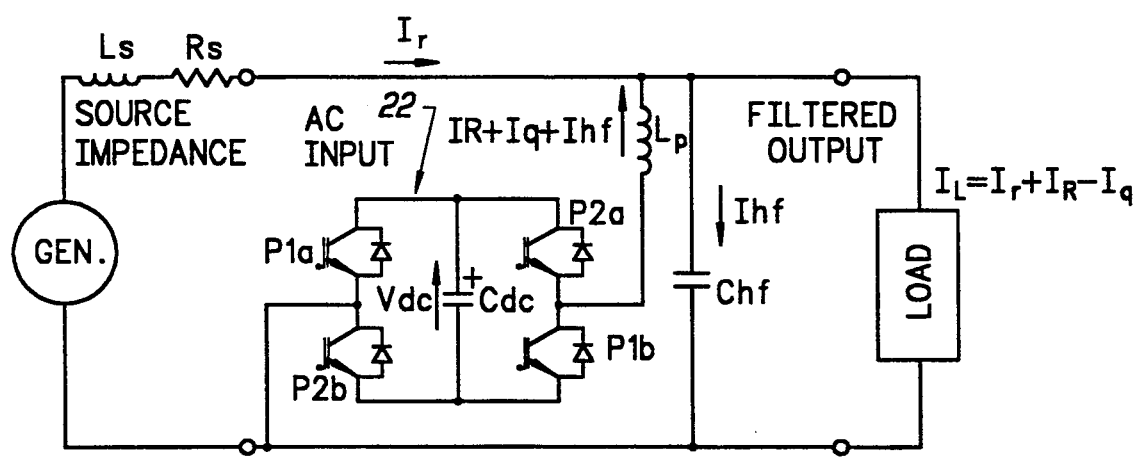
FIG. 2 is a parallel connected voltage source active filter in accordance with the prior art.
Figure 3:
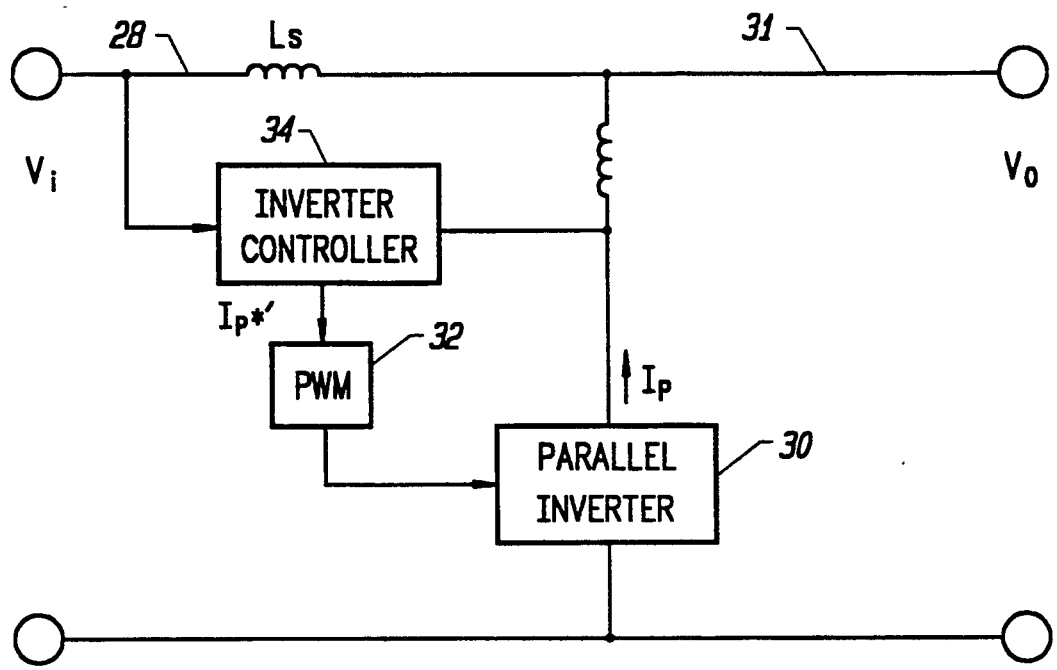
FIG. 3 is a simplified depiction of the major elements of the present invention.

FIG. 3 depicts a simplified representation of the apparatus of the invention. The apparatus is coupled to an input line 28 via a series inductor Ls. A parallel inverter 30 is coupled to an output line 31. The parallel inverter 30 incorporates a prior art dc-link (not shown). A parallel inverter current reference signal is processed by a pulse width modulator 32 of the type known in the art. Inverter controller 34 creates the unique parallel inverter current reference signal of the invention.

Figure 4:
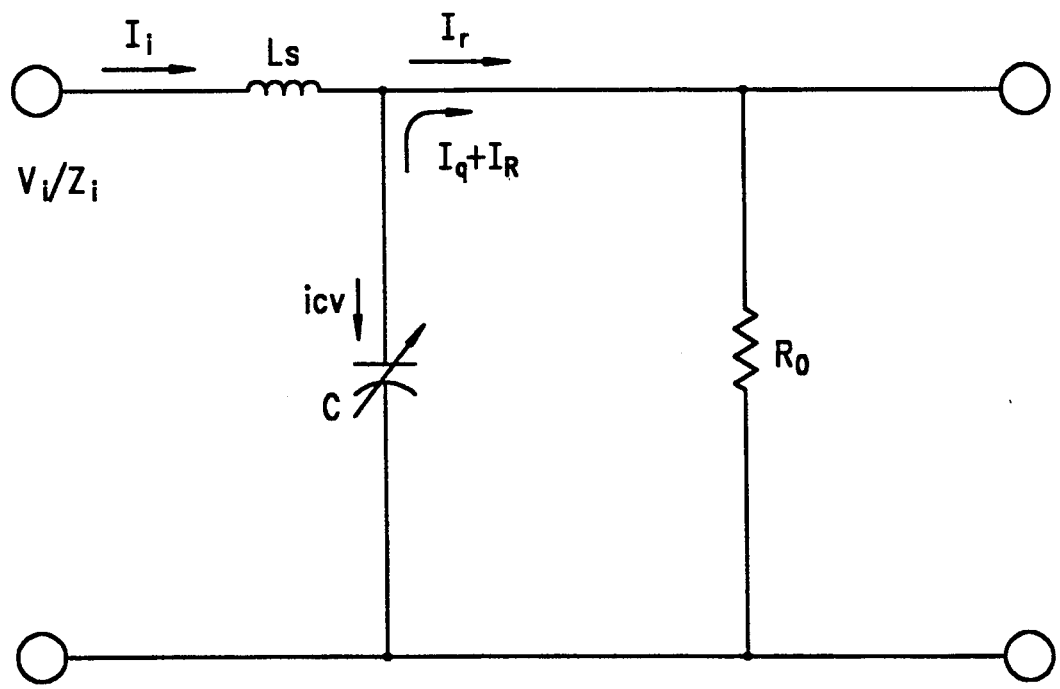
FIG. 4 is an electrically equivalent schematic of the elements of the invention.

FIG. 4 is an electrically equivalent schematic of the apparatus of the invention. As can be seen, the inverter controller 34, pulse width modulator 32, and parallel inverter 30 act in combination as a variable capacitor C. The variable capacitance inverter of the invention is required because the inductor Ls causes an output voltage drop and a phase shift to the input current, resulting in the output voltage being out of phase with the input voltage. The amount of voltage drop and phase shift are load dependent. In the absence of a load there is no phase shift ($\phi_1$); as the load increases, the phase shift ($\phi_1$) increases. Similarly, the inverter acts as a variable inductor if the voltage regulation requires an attenuation instead of amplification of the existing input voltage.

Real power flowing out of the dc-link of the parallel inverter 30 indicates insufficient phase shift ($\phi_1$) of an output voltage reference signal ($V_o^*$) with respect to the input voltage ($V_i$). Conversely, power inflow into the dc-link of the parallel inverter 30 indicates excessive phase shift of the output voltage reference signal ($V_o^*$) with respect to the input voltage ($V_i$). The real power flow into the dc-link of the parallel inverter 30 results in dc-link voltage magnitude errors. Improper phase shift and voltage magnitude errors are avoided with the active power line conditioner of the invention.

The invention identifies and feeds-forward a desired phase shift value to maintain the output voltage reference signal in proper phase relationship with the input voltage signal. This reduces the power in-flow and out-flow from the dc-link of the parallel inverter. Thus, by controlling the phase shift of the output voltage reference signal, voltage control of the dc-link is realized. The voltage magnitude control of the output is realized through a derived tuning capacitance current reference signal. The tuning capacitance current reference signal is combined with other current references to render the parallel inverter reference signal of the invention.

Figure 5:
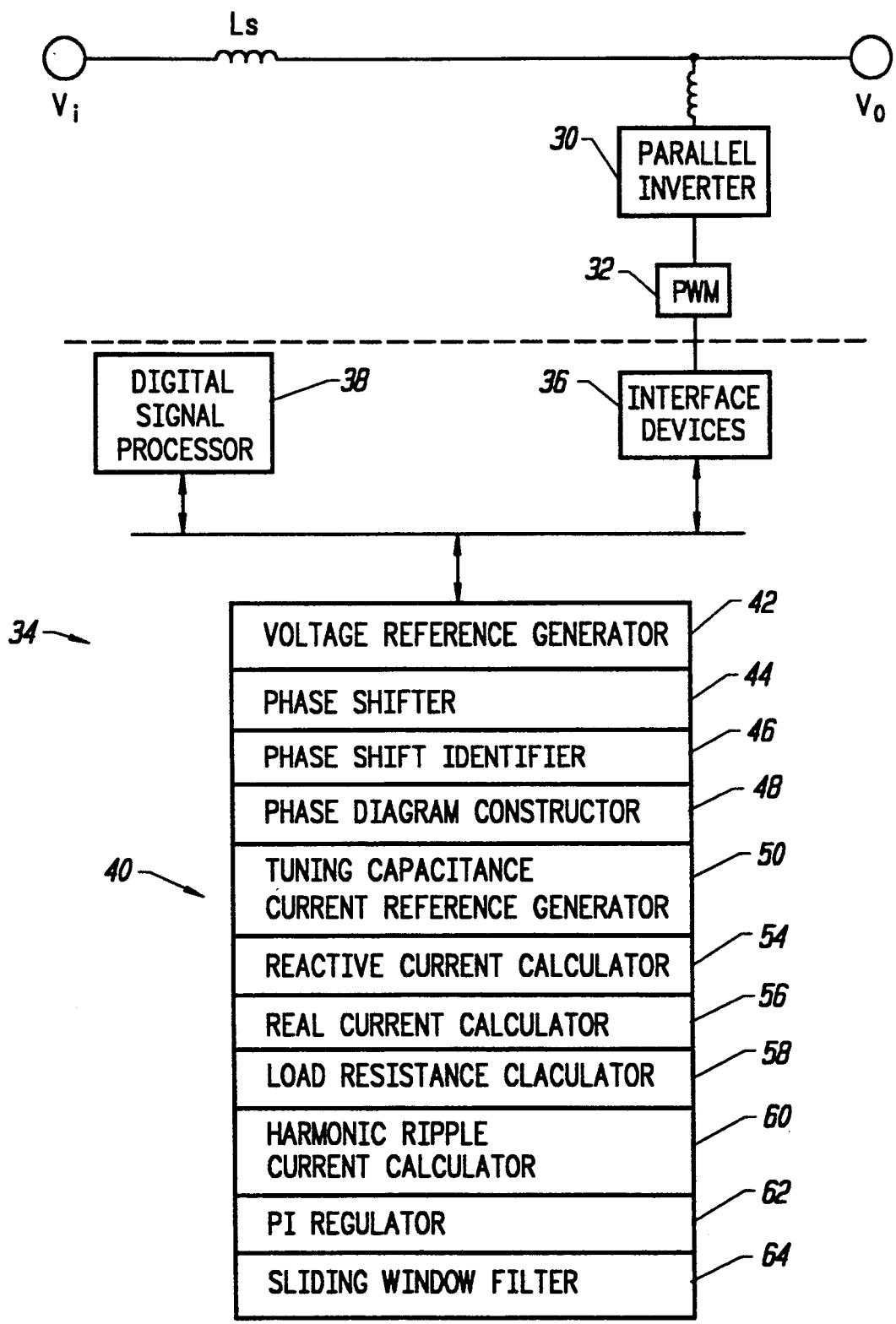
FIG. 5 is a depiction of the analog and digital components of a preferred embodiment of the invention.

Turning to FIG. 5, a digital/analog embodiment of the invention is disclosed. In a preferred embodiment, the inverter controller 34 is in a digital form. Specifically, the inverter controller 34 includes a number of digital elements which are coupled to the analog parallel inverter 30 and its corresponding pulse width modulator 32 through interface devices 36. The interface devices 36 provide analog/digital and digital/analog conversions between the analog and digital components of the invention. The interface devices 36 may also include computer interface devices such as keyboards and monitors. The interface devices 36 are coupled to a digital signal processor 38 and a memory unit 40. The interactions between a digital signal processor 38, a memory unit 40, and interface devices 36 are known in the art.

The memory unit 40 includes a number of control programs unique to the apparatus of the present invention. As will be more fully described below, the control programs of the invention include: a voltage reference generator 42, a phase shifter 44, a phase shift identifier 46, a phase diagram constructor 48, a tuning capacitance current reference generator 50, a reactive current calculator 54, a real current calculator 56, a harmonic current calculator 60, a proportional-integral regulator 62, and a sliding window filter 64.

Figure 6:
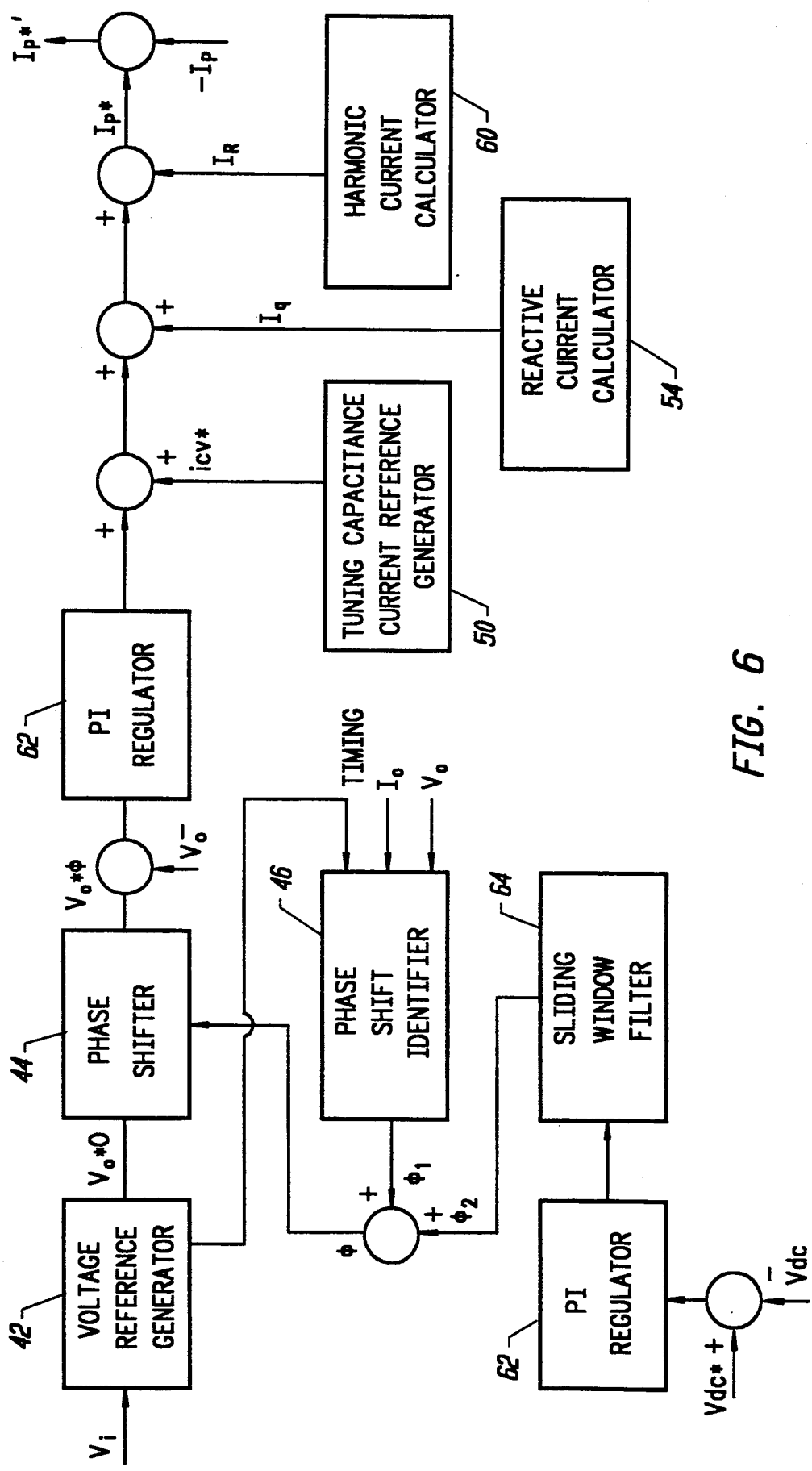
FIG. 6 depicts, in an analog fashion for illustrative purposes, the processing of a parallel inverter current reference signal in accordance with the invention.

These control programs, or functional units, may also be realized in analog structures. FIG. 6 depicts an analog representation of the execution units of the invention and their interaction with one another. Voltage reference generator 42 locks on the voltage input signal $V_i$ and generates a unity amplitude sinusoidal voltage output reference signal $V_o^*0$. In an analog implementation, the voltage reference generator 42 may employ a phase locked loop. A digital phase locked loop may be employed in a digital implementation.

Figure 7:
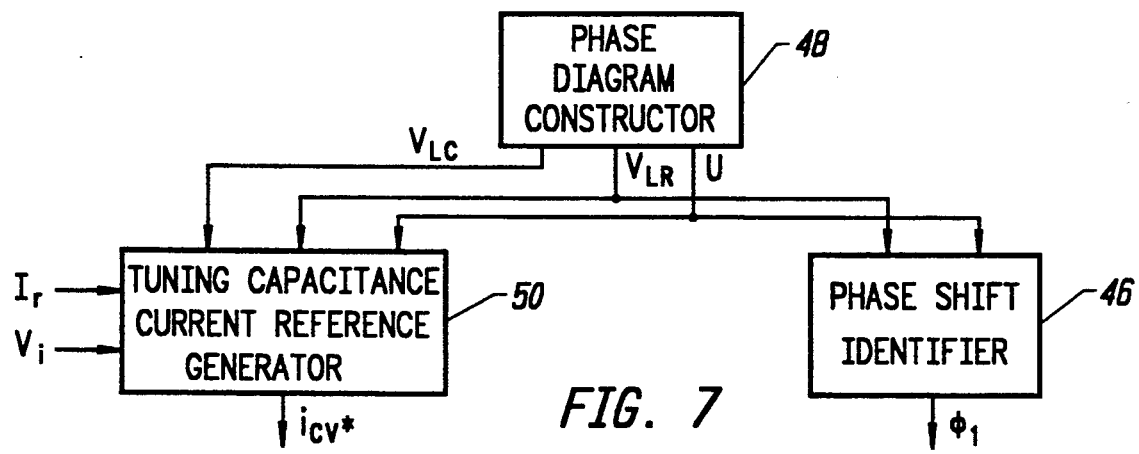
FIG. 7 depicts the relationship between a number of digital components of the invention which are used to process a parallel inverter current reference signal.

The resultant voltage output reference signal $V_o^*0$ produces a signal with proper magnitude, in phase with the input voltage. In order to anticipate the required output voltage phase shift, $V_o^*\phi$, with respect to the $V_o^*0$ phase reference, a phase shift identifier 46 is invoked. As shown in FIG. 7, the phase shift identifier 52 relies upon a phase diagram constructor 48. In turn, values associated with the phase diagram constructed by the phase diagram constructor 48 are derived through a reactive current calculator 54, a real current calculator 56, a load resistance calculator 58, and a harmonic current calculator 60, as depicted in FIG. 8.

Figure 9:
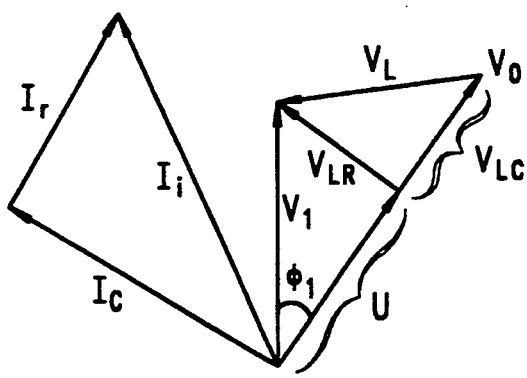
FIG. 9 depicts a phasor representation of the circuit of FIG. 4.

The phase diagram constructor 48 of the invention generates an equivalent phasor representation of the circuit of the invention. That is, the phasor representation of the circuit of FIG. 4 is generated, as shown in FIG. 9. The phasor diagram of FIG. 9 depicts the input current Ii, and its relationship to the capacitor current Ic and the real current $I_R$. The phasor diagram also depicts the output voltage $V_o$, which may be divided into two segments $V_{LC}$ and U. The phasor diagram depicts the relationship between the input voltage $V_i$, the lagging output voltage $V_o$, the phase angle ($\phi_1$), the inductor voltage $V_L$, and the inductor/resistor voltage $V_{LR}$.

Based upon the phasor diagram of FIG. 9 and a number of known parameters, a number of additional parameters may be derived to optimally control the active power line conditioner of FIG. 4. The additional parameters may be derived in the following order.

Figure 8:
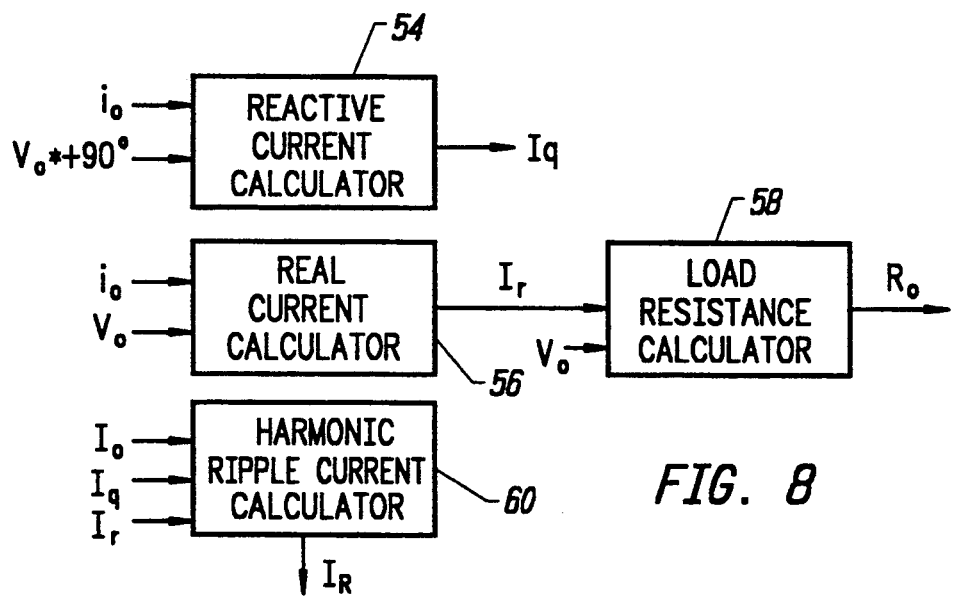
FIG. 8 depicts the relationship between a number of digital components of the invention which are used to process a parallel inverter current reference signal.

Turning to FIG. 8, a reactive current calculator 54 is depicted. The reactive current calculator provides that portion of the inverter current reference signal which is used for power factor correction. The inputs to the reactive current calculator 54 are the instantaneous output current $i_o$ and the voltage reference signal $V_o*+90°$. The voltage reference signal $V_o*+90°$ can be obtained from the voltage reference generator 42 in FIG. 6. The instantaneous output current $i_o$ is a measured quantity. The voltage reference signal $V_o*$ is set to a unity amplitude (1 Per Unit) of 120 Volts. Given these inputs, the output reactive power VAo may be calculated through equation (1):

$$VA_o = i_o(V_o*+90°).$$

Thus, the output reactive power is obtained by multiplying the instantaneous input current by the phase-shifted voltage reference signal $V_o*$. The output reactive power may then be used to calculate the output reactive current $I_q$. Specifically, by dividing the instantaneous output voltage into the output reactive power, the output reactive current $I_q$ is obtained, as described in equation (2):

$$I_q = VA_o/V_o.$$

The reactive current $I_q$ is preferably obtained through a "sliding window" averager. A sliding window averager provides a sum of present input and $N-1$ previous inputs. As each new sample input is read, the oldest sample input is dropped out of the sum. This technique is described in U.S. Pat. No. 4,811,236, which is expressly incorporated by reference herein.

The output reactive current $I_q$ may be conveyed to a real current calculator 56. Calculation of the real current $I_r$ is realized by first calculating the real power output $W_o$ through equation (3):

$$W_o = i_o * V_o.$$

That is, the real power output is obtained by multiplying the instantaneous output current by the instantaneous output voltage. The real current $I_r$ is then obtained through equation (4):

$$I_r = W_o/V_o.$$

The output voltage $V_o$ is known because it is set to 1 P.U. (Per Unit) by design, for example 120 V. The real current $I_r$ is preferably obtained through a "sliding window" averager, as previously described.

The real current $I_r$ is used by the load resistance calculator 58 to determine the load resistance $R_o$. The load resistance $R_o$ is obtained through equation (5):

$$R_o = V_o/I_r.$$

That is, the load resistance is obtained by dividing the real current into the output voltage $V_o$, which is known to be set at 1 P.U. The value Ro is not necessary to calculate for the vector method of FIG. 4, but can be used in deriving the current and phase references in real time by mathematical modeling of FIG. 4, as described below.

The real current $I_r$ is also used by the harmonic current calculator 60. The inputs to the harmonic current calculator 60 are the output reactive current $I_q$, the real current $I_r$, and the output current $I_o$. The real time output current $i_o$ is a measured quantity. The harmonic calculator 60 calculates instantaneous ripple current $i_R$ values in real time through equation (6):

$$i_R = i_o - (i_r + i_q)$$

Thus, the harmonic calculator 60 establishes a harmonic current component so that the inverter may locally generate harmonics for the load.

Returning now to FIG. 7, the processing associated with the tuning capacitance current reference generator and the phase error identifier 52 may now be detailed. As previously stated, the phase diagram constructor generates a phasor representation, shown in FIG. 9, corresponding to the circuit of FIG. 4. In the phasor diagram of FIG. 9, the following variables are known from measurements made through standard techniques: the output current $I_o$, the input voltage $V_i$, and the output voltage $V_o$. As previously described, the real current $I_r$ is derived by the real current calculator 56.

To determine the tuning capacitance current reference $i_{cv}*$ and the desired phase shift ($\phi_1$), the magnitude of the voltage segments $V_{LC}$ and U must be determined. The tuning capacitance current reference generator executes the following equations to derive these values. First, the inductor voltage $V_{LR}$, due to the resistive current. $I_r$, is defined. This quantity may be characterized by equation (7):

$$V_{LR} = I_r * X_L.$$

The real current $I_R$ was previously defined. The impedance $X_L$ of series inductor L, may be defined through equation (8):

$$X_L = 2\pi * 60 * L_s.$$

The "60" term corresponds to a 60 hertz signal and the "Ls" term corresponds to a known inductor value for the inductor $L_s$ of FIG. 4.

With $V_{LR}$ known, the voltage segment U may be characterized, for example, by simple trigometric relationships through equation (9):

$$u = \sqrt{V_i^2 - V_{LR}^2}$$

With U known, the value of the voltage segment $v_{LC}$ may be determined through equation (10):

$$V_{LC} = V_o - U.$$

As previously stated, $V_o$ is a known quantity set at 1 P.U. Now, all values are known to determine the tuning capacitance current reference $i_{cv}*$, which is defined by equation (11):

$$i_{cv}* = V_{LC}/X_L.$$

The derived parameters are also used by the phase shift identifier 52 which establishes the phase shift ($\phi_1$).

The phase shift ($\phi_1$) is depicted in the phasor diagram of FIG. 9. Through known trigometric relationships, the desired phase ($\phi_1$) may be defined through equation (12) as:

$$\phi_1 = \arctan V_{LR}/U.$$

The desired phase ($\phi_1$) may also be defined through equation (12') as:

$$\phi_1 = \arcsin V_{LR}/V_i.$$

Thus, phasor techniques have been described for defining a tuning capacitance current reference $i_{cv^*}$ which results in the proper capacitive value represented by an active power line conditioner which has only a parallel inverter. The tuning capacitance current reference $i_{cv^*}$ provides the proper current via the series inductor $L_s$ to obtain the appropriate output voltage magnitude.

Phasor techniques have also been described for defining the desired phase shift ($\phi_1$). This derived phase shift may be used to regulate the actual phase shift between the output voltage reference signal and the input voltage signal. This effectively results in voltage control of the dc-link.

The phase shift ($\phi_1$) and tuning capacitance current reference $i_{cv^*}$ may be derived through other techniques in accordance with the invention. For instance, these values may be defined through mathematical modeling of the circuit of FIG. 4. The input impedance for the circuit of FIG. 4 may be defined through equation (13) as:

$$Z_i = jwL + \frac{1}{\frac{1}{R} + jwC} = jwL + \frac{R}{1 + jwRC}$$

The output impedance may be described through equation (14) as:

$$Z_o = \frac{R}{1 + jwRC}$$

Then, the input current may be defined through equation (15) as:

$$I_i = \frac{V_i}{Z_i} = \frac{v_i}{jwL + \frac{R}{1 + jwRC}}$$

The output voltage may then be defined through equation (16) as:

$$V_o = I_i^* Z_o = \left(\frac{v_i}{jwL + \frac{R}{1+jwRC}}\right) * \left(\frac{R}{1+jwRC}\right)$$

Mathematical manipulation of equation (16) results equation (17):

$$V_o = \frac{v_i(R^2 - w^2R^2LC)}{(R - w^2RLC)^2 + (wL)^2} + j\frac{v_iwL}{(R - w^2RLC)^2 + (wL)^2}$$

The elements of equation (17) may be simply characterized through equation (18) as:

$$V_o = A + jB.$$

The desired phase shift may then be defined through equation (19) as:

$$\phi_1 = \arctan(B/A).$$

The tuning capacitance current reference may be defined by recognizing that the absolute value of $V_o$ is defined in equation (20) as:

$$V_o = \sqrt{A^2 + B^2}$$

Note that the "A" and "B" terms are expressed in relation to a capacitance value C. Since all other terms in equation 17 are known, it may be solved for the capacitance term C. Once C is known, the tuning capacitance current reference may be defined through equation (21) as:

$$i_{cv^*} = V_o/wC.$$

The omega term (w) is equal $2\pi f$, where f=frequency=60 (Hertz) and $V_o$ is measured.

The obvious drawback of the mathematical approach described is the complexity of the mathematical model. Yet another approach for defining the tuning capacitance current reference $i_{cv^*}$ and phase shift $\phi_1$ is to rely upon an iterative method for defining the terms. In other words, a mathematical model of the circuit of FIG. 4 is defined. Then, various values for $V_i$ and R are selected. The capacitance C is then varied under the given $V_i$ and R conditions until the voltage output magnitude becomes 1 P.U. (120 Volts). The resultant C and $\phi_1$ values are then placed in a look-up table. In subsequent operation of the apparatus of the invention, a given input voltage will be matched with a corresponding tuning capacitance current reference value and a phase shift value from the look-up table. Naturally, a look-up table may be used to store values derived using the phasor approach and mathematical approach described above. This eliminates the need for real-time execution of the phasor and mathematical techniques.

Regardless of the method used, the derived phase shift value ($\phi_1$) is used to eliminate any existing phase error between the output voltage reference signal and the output voltage signal. This will reduce the power in-flow and out-flow from the dc-link. The derived tuning capacitance current reference signal $i_{cv^*}$ provides the proper current to eliminate output voltage magnitude errors.

Returning now to FIG. 6, the additional components of the parallel current reference signal of the invention will be described. As discussed, the phase shift identifier 46 will define the desired phase shift between the output voltage reference signal and the input voltage signal. This phase shift ($\phi_1$) value may be trimmed by a dc-link voltage error signal ($\phi_2$). The dc-link voltage error signal is derived by comparing the measured dc-link voltage $V_{dc}$ to a dc-link reference voltage $V_{dc}^*$.

The difference between the actual dc-link voltage and the dc-link reference voltage is processed by a standard proportional-integral regulator 62. The output of the regulator 62 is preferably processed by a sliding window filter 64. As described above, a sliding window filter provides a sum of the present input and N−1 previous inputs. As each new sample input is read, the oldest sample input is dropped out of the sum.

In view of the derived phase shift ($\phi_1$), as trimmed by the dc-link error value ($\phi_2$), the phase shifter 44 anticipates and provides the proper phase shift between the output voltage reference signal $V_o*0$ and the input voltage signal $V_i$. The resultant phase trimmed voltage reference signal $V_o*\phi$ is compared with the actual voltage output value $V_o$. The difference of these signals is processed by proportional-integral regulator 62.

Then, a number of current reference components are added to the parallel inverter current reference signal. Specifically, the tuning capacitance current reference signal $i_{cv*}$ is added to the reference signal by tuning capacitance current reference generator 50. The reactive current calculator adds the reactive current component $I_q$ to the parallel current reference signal. The harmonic current calculator 60 then provides the $i_R$ signal previously described.

In a preferable embodiment of the invention, the resultant parallel inverter current reference signal $I_p*$ is combined with the measured parallel current output signal $I_p$ to render the parallel inverter current input error signal $I_p*'$. The parallel current input error signal $I_p*'$ is converted through interface devices 36 to an analog signal which is applied to pulse width modulator 32. The pulse width modulator 32 converts the parallel current input error signal into appropriate switching commands for the parallel inverter 30.

Thus, a low cost active power line conditioner has been disclosed. The active power line conditioner of the invention uses only a parallel inverter and does not require surge protection devices. Control of the active power line conditioner is obtained through derived voltage phase shift and inverter capacitance or inductance parameters. Specifically, voltage control of the dc-link is realized through phase shifts of an output voltage reference signal, and modulation of a capacitive or inductive inverter current controls the output voltage magnitude.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents. Naturally, the foregoing techniques may be applied to both single and multiphase AC power conditioners.

We claim:

1. An active power line conditioner comprising:
    an input node connected to an input line including a series inductor;
    an output node connected to an output line;
    a parallel inverter coupled to said output node, said parallel inverter including a dc-link; and
    a parallel inverter controller coupled to said input node, said output node, and said parallel inverter, said parallel inverter controller forcing said parallel inverter to act as a variable capacitor, said parallel inverter controller including
    means for generating a desired phase shift value between an active power line conditioner voltage output signal and an active power line conditioner voltage input signal, said desired phase shift resulting in voltage control of said dc-link, and
    means for producing a tuning capacitance current reference signal to reduce voltage magnitude errors of said output voltage.

2. The active power line conditioner of claim 1 wherein said parallel inverter controller includes means for constructing a phasor representation of currents and voltages corresponding to the operation of said active power line conditioner, said phasor representation being used by said generating means to generate said desired phase shift and said producing means to produce said tuning capacitance current reference signal.

3. The active power line conditioner of claim 1 wherein said parallel inverter controller includes means for constructing a mathematical model of the operation of said active power line conditioner, said mathematical model being used by said generating means to generate said desired phase shift and said producing means to produce said tuning capacitance current reference signal.

4. The active power line conditioner of claim 1 wherein said parallel inverter controller includes a look-up table with a plurality of iteratively derived values corresponding to a plurality of desired phase shift values and a plurality of tuning capacitance current reference signals, said generating means relying upon said plurality of desired phase shift values to select said desired phase shift value, and said producing means relying upon said plurality of tuning capacitance current reference signals to select said tuning capacitance reference signal.

5. The active power line conditioner of claim 1 further comprising:
    means for identifying a dc-link voltage error signal; and
    means for combining said dc-link voltage error signal with said phase shift value to produce a trimmed phase shift value.

6. The active power line conditioner of claim 1 further comprising:
    means for calculating a reactive current signal; and
    means for combining said tuning capacitance reference signal and said reactive current signal to render a preliminary parallel inverter current signal.

7. The active power line conditioner of claim 6 further comprising:
    means for deriving a harmonic current signal; and
    means for adding said preliminary parallel inverter current signal and said harmonic current signal to render a secondary parallel inverter current signal.

8. The active power line conditioner of claim 7 further comprising:
    means for subtracting an actual parallel inverter current output signal from said secondary parallel inverter current signal to render a parallel inverter current reference signal.

9. The active power line conditioner of claim 8 further comprising:
    a pulse width modulator positioned between said parallel inverter and said parallel inverter controller, said pulse width modulator receiving said parallel inverter current reference signal and generating switching command signals for said parallel inverter.

10. A method of operating an active power line conditioner of the type including an input node coupled to an input line including a series inductor, a parallel inverter coupled to an output node connected to an output line, said parallel inverter including a dc-link, said active power line conditioner further including a parallel inverter controller coupled to said input node and said parallel inverter, said parallel inverter of said active power line conditioner performing the following steps:

generating a desired phase shift value between an active power line conditioner voltage output signal and an active power line conditioner voltage input signal, said desired phase shift resulting in voltage control of said dc-link, and producing a tuning capacitance current reference signal to reduce voltage magnitude errors of said output voltage.

11. The method of claim 10 further comprising the step of constructing a phasor representation of currents and voltages corresponding to the operation of said active power line conditioner, said phasor representation being used during said generating step to generate said desired phase shift and during said producing step to produce said tuning capacitance current reference signal.

12. The method of claim 10 further comprising the step of constructing a mathematical model of the operation of said active power line conditioner, said mathematical model being used during said generating step to generate said desired phase shift and during said producing step to produce said tuning capacitance current reference signal.

13. The method of claim 10 further comprising the step of constructing a look-up table with a plurality of iteratively derived values corresponding to a plurality of desired phase shift values and a plurality of tuning capacitance current reference signals, said look-up table be used during said generating step to select said desired phase shift value, and during said producing step to select said tuning capacitance reference signal.

14. The method of claim 10 further comprising the steps of:

identifying a dc-link voltage error signal; and combining said dc-link voltage error signal with said phase shift value to produce a trimmed phase shift value.

15. The method of claim 14 further comprising the steps of:

calculating a reactive current signal; and combining said tuning capacitance reference signal and said reactive current signal to render a preliminary parallel inverter current signal.

16. The method of claim 15 further comprising the steps of:

deriving a harmonic current signal; and adding said preliminary parallel inverter current signal and said harmonic current signal to render a secondary parallel inverter current signal.

17. The method of claim 16 further comprising the step of:

subtracting an actual parallel inverter current output signal from said secondary parallel inverter current signal to render a parallel inverter current reference signal.

18. The method of claim 17 further comprising the step of:

positioning a pulse width modulator between said parallel inverter and said parallel inverter controller, said pulse width modulator receiving said parallel inverter current reference signal and generating switching command signals for said parallel inverter.

* * * * *